United States Patent
Wilcox et al.

(10) Patent No.: US 11,535,729 B2
(45) Date of Patent: Dec. 27, 2022

(54) DEGRADABLE FISHING LINES AND NETS

(71) Applicant: Enviro Cast, LLC, Pinedale, WY (US)

(72) Inventors: Loren James Wilcox, Pinedale, WY (US); Gary Metzger, Jupiter, FL (US)

(73) Assignee: Enviro Cast, LLC, Pinedale, WY (US)

( * ) Notice: Subject to any disclaimer, the term of this patent is extended or adjusted under 35 U.S.C. 154(b) by 0 days.

(21) Appl. No.: 17/592,125

(22) Filed: Feb. 3, 2022

(65) Prior Publication Data

US 2022/0251343 A1    Aug. 11, 2022

Related U.S. Application Data

(60) Provisional application No. 63/146,839, filed on Feb. 8, 2021.

(51) Int. Cl.

| | |
|---|---|
| *C08L 1/12* | (2006.01) |
| *A01K 75/00* | (2006.01) |
| *A01K 91/00* | (2006.01) |
| *D07B 5/06* | (2006.01) |

(52) U.S. Cl.
CPC .............. *C08L 1/12* (2013.01); *A01K 75/005* (2022.02); *A01K 91/00* (2013.01); *C08L 2201/06* (2013.01); *C08L 2203/12* (2013.01); *C08L 2207/322* (2013.01); *D07B 5/06* (2013.01); *D07B 2205/103* (2013.01); *D07B 2501/2038* (2013.01)

(58) Field of Classification Search
CPC .... C08L 1/12; C08L 2201/06; C08L 2203/12; C08L 2207/322; A01K 75/005; A01K 91/00; D07B 5/06; D07B 2205/103; D07B 2501/2038
USPC ............................................................. 43/7
See application file for complete search history.

(56) References Cited

U.S. PATENT DOCUMENTS

| | | | |
|---|---|---|---|
| 1,602,312 A | 10/1926 | Qurin | |
| RE19,019 E | 12/1933 | Metcalf | |
| 2,988,455 A | 6/1961 | Rosenberg et al. | |
| 5,446,079 A * | 8/1995 | Buchanan | C08L 67/02 528/308 |
| 2003/0050667 A1 | 3/2003 | Grafton et al. | |
| 2008/0300683 A1 | 12/2008 | Altman et al. | |
| 2010/0249332 A1 * | 9/2010 | Ferguson | D01F 6/92 264/176.1 |
| 2012/0029561 A1 | 2/2012 | Olson | |
| 2013/0309295 A1 | 11/2013 | Gatenholm | |
| 2014/0223799 A1 | 8/2014 | Bossone, III | |
| 2015/0073474 A1 | 3/2015 | Hodgkinson | |
| 2015/0148823 A1 | 5/2015 | Mortarino et al. | |
| 2019/0142993 A1 | 5/2019 | Parikh et al. | |
| 2019/0307111 A1 * | 10/2019 | Wilcox | D07B 5/02 |

FOREIGN PATENT DOCUMENTS

| | | | |
|---|---|---|---|
| CN | 108796659 | * | 11/2018 |
| EP | 0666364 | A2 | 8/1995 |
| JP | 4334448 | | 11/1992 |

OTHER PUBLICATIONS

Translation of CN 108796659, Nov. 13, 2018. (Year: 2018).*
Nomura et al., Appl. Microbiol Biotechnol., 73, 969-979, 2007. (Year: 2007).*
Non-Final Office Action dated Apr. 19, 2022 for U.S. Appl. No. 16/376,377, filed Apr. 5, 2019, 13 pages.
Vieira, M., et al. (2011) "Natural-based plasticizers and biopolymer films: A review", European Polymer Journal, 47:254-263.
Vaha-Nissi, M., et al. (2010) "Aqueous Dispersions from Biodegradable/Renewable Polymers", VTT Technical Research Centre of Finland, Espoo, Rajamiiki, Finland, pp. 1-14.
"Singeing—Types of Singeing process—Application of Singeing in the textiles dyeing industry", Textile Scholars, May 2019, provided in electronic format at: https://textilesscholars.blogspot.com/2019/05/singeing-application-processes-of.html, 8 pages.

* cited by examiner

*Primary Examiner* — Hui H Chin
(74) *Attorney, Agent, or Firm* — Kagan Binder, PLLC

(57) ABSTRACT

The disclosure provides embodiments of environmentally acceptable fishing lines or fishing nets. Embodiments of the disclosed fishing line or net may comprise a degradable polymer having components derived from i) biomass sources, ii) protein, fatty acid or lipid sources, iii) microbial-based monomers and polymers, iv) agro-based monomers and polymers, v) sugar or starch based monomers and polymers, or combinations thereof, as well as fishing lines and nets that further comprise an additive having components derived from i) polyol sources, ii) citrate sources, iii) fatty acid sources, iv) biomass oil sources, or combinations thereof. Some of the embodiments of the disclosed fishing lines or nets may have a suitable fiber core, while other embodiments of the disclosed fishing lines or nets are degradable over a predetermined period of time. The disclosed embodiments are preferred because of the low environmental impact of the disclosed fishing lines or nets.

16 Claims, No Drawings

DEGRADABLE FISHING LINES AND NETS

CROSS REFERENCE TO RELATED APPLICATION

This application claims the benefit of U.S. Provisional Patent Application No. 63/146,839, filed Feb. 8, 2021, the disclosure of which is incorporated in its entirety herein by reference.

BACKGROUND

Many aquatic birds, horseshoe crabs, sea turtles, and marine mammals are injured or killed each year as the result of becoming tangled in fishing line and its associated hooks and tackle that have been improperly disposed of along beaches or thrown over from boats into the water. Fishing lines are a hazard to all aquatic wildlife because they are mostly clear and animals can become entangled in them. Or worse, they can ingest the lines and die.

Hooks and lines caught on branches and debris can harm animals and cause them to become tangled on legs, wings, and beaks of birds. Geese, ducks and gulls sustain crippling injuries after one or both of their legs become wrapped in fishing line. A hook caught in a beak or mouth can make eating painful or impossible, resulting in death by starvation.

For at least these reasons, as well as other environmental concerns and issues, there is a need for fishing lines and related fishing equipment that will degrade and will be respectful of the environmental.

SUMMARY

The disclosure provides embodiments of environmentally acceptable fishing lines and fishing nets that include various embodiments of a degradable composition comprising degradable polymers. In other embodiments, environmentally acceptable fishing lines and fishing nets comprise degradable polymers and additives that minimize the environmental impact of such a combination. In still other embodiments fishing lines and fishing nets comprise suitable degradable additives, including but are not limited to, additional polymers or additives. In some embodiments, the degradable polymers and additives are produced from renewable materials. Some of the embodiments of the disclosed fishing lines or fishing nets include, for example, a monofilament line, a single strand line, or a braided or plaited line made from multiple threads, strands or yarns. Other embodiments of the disclosed fishing lines or nets are degradable over a predetermined timeline. These embodiments are preferred because of the low environmental impact of the disclosed fishing lines or fishing nets when compared to, for example, well known synthetic polymer fishing lines or fishing nets.

According to a first embodiment of the present disclosure, a degradable composition for fishing lines or fishing nets comprising degradable polymer is disclosed. Related embodiments further comprise additives such as additional polymers, additional degradable polymers, plasticizers or degradable plasticizers. In other related embodiments, the degradable polymers and degradable additives comprise components that are produced from renewable materials.

Suitable degradable polymers may comprise degradable polymers such as, for example, polybutylene succinate, polybutylene succinate adipate, poly lactic acid, polyhydroxyalkaonate, polyhydroxy butyrate, poly(butylene adipate-co-terephalate), poly alginate, or polyglycolide. Other suitable degradable polymers may comprise renewable components derived from i) biomass sources (including fossil biomass sources), ii) protein, fatty acid or lipid sources, iii) microbial-based monomers and polymers, iv) agro-based monomers and polymers, sugar or starch-based monomers and polymers, or combinations thereof. Some embodiments include, for example, lignin, or cellulosic polymers such as polymers of cellulose acetate, cellulose propionate, cellulose butyrate, or combinations thereof. Still other suitable degradable polymers may comprise isosorbide-based polymers such as, for example, monomethacrylated isosorbide derivatives that are polymerized to provide rigid polymethylacrylates or replacing known diols monomers with isosorbide derivatives to provide polyesters or polycarbonates.

Suitable additives include, but are not limited to, additional polymers or additional degradable polymers, renewable polymers, degradable plasticizers, or both renewable and degradable plasticizers. In various embodiments, suitable additives may comprise components derived from polyol sources, citrate sources, fatty acid sources, biomass oil sources, or combinations thereof. Some embodiments include, for example, components derived from vegetable oils, non-vegetable plant oils, or combination thereof. Still other embodiments may include components derived coconut oil, corn oil, cottonseed oil, canola oil, olive oil, palm oil, peanut oil, safflower oil, sesame oil, soybean oil, sunflower oil, grapeseed oil, sorghum oil, wheat germ oil, or combinations thereof. Other embodiments may comprise suitable additives such as for example, triacetin, tripropionin, triethyl citrate, tributyl citrate, tributyl 2-acetyl citrate, low molecular weight poly(ethylene glycol, propylene glycol, soybean oil, epoxidized soybean oil, sodium alginate, sodium carboxymethyl cellulose, guar gum, locust bean gum, carrageenan, gelatin, pectin, dibutyl phthalate, pine pitch or tall oil pitch.

Some disclosed embodiments the disclosed fishing lines or nets comprise a natural fiber core. Suitable natural fiber cores for fishing lines or nets may include, for example, single strand or braided fiber lines that contain core components such as, but not limited to, cotton, jute, hemp, silk, bamboo, linen, flax, wool, sisal, lignin or combinations of these core components. In selected embodiments such cores may be coated with renewable and degradable polymers and renewable and degradable additives as disclosed above.

Other disclosed embodiments may include degradable compositions for fishing lines or fishing nets consisting essentially of i) a renewable and degradable polymer, ii) a renewable and degradable additive, and iii) minor components generally recognized and used when making suitable fishing lines or fishing nets exemplified in this disclosure.

DETAILED DESCRIPTION

Fishing Lines or Fishing Nets

This disclosure provides various embodiments of fishing lines or fishing nets that have a low environmental impact when compared to currently available fishing lines or nets typically made from synthetic or petroleum-based components that do not degrade or that are generally not renewable. The environmentally acceptable components that are set out in this disclosure may be used to make a variety of fishing equipment including, but not limited to, fishing lines, fly fishing lines, landing nets, casting nets or seine nets.

The disclosed degradable lines or nets may be various types of line, such as a monofilament line, a single stand line, a variety of multi-strand lines as well as suitable coated lines. In some embodiments, such lines or nets may be produced both degradable and renewable components. Well known manufacturing and production techniques may be readily adapted to make or produced the disclosed fishing lines or nets. Suitable processes may include spraying, extruding, co-extruding, coating, submersing, laminating, extrusion coating, extruding over a core, or combinations of such processes. Different types of lines and processes are reported, for example, in U.S. Published Patent Application US 2019/0307111 A1 published Oct. 10, 2019, titled "Renewable Natural Fiber Fishing Line". This published application is incorporated by reference herein for all purposes.

Renewable and Degradable Polymers and Additives

As described herein, some embodiments of the disclosed monofilament, single strand or braided fishing line or net include polymers, additives, or coatings and polymer solutions. The polymer materials may include, for example, a biopolymer, an organic polymer, a natural polymer, and/or other environmentally acceptable polymers. In some embodiments, suitable coatings or polymers are preferably environmental-friendly, renewable, degradable materials that provide the fishing line or net with enhanced physical and mechanical properties including, but not limited to, pigment and barrier properties. Barrier properties may include, for example, a barrier against water, water vapor, grease and oil and/or other permeants. In some embodiments, suitable renewable coatings and polymers may include polymers derived from i) biomass sources, ii) protein, fatty acid or lipid sources, iii) microbial-based monomers and polymers, iv) agro-based monomers and polymers, v) sugar or starch-based sources, or combinations thereof. Other suitable polymers may include polylactides, polybutylene succinate, polybutylene succinate adipate, poly lactic acid, polyhydroxyalkanoate, polyhydroxy butyrate, poly (butylene adipate-co-terephalate), poly alginates, polyglycolides, polyhydroxyalkaonates, polysaccharides, lignin, or proteins. Still other suitable polymers may include cellulosic polymers such as, but not limited to cellulose acetate, cellulose propionate, cellular butyrate, and combinations thereof. In some embodiments, suitable polymers may be used to make solvent-based dispersions that are readily applied to the fishing line or net. In yet other embodiments, suitable polymers may be used to make aqueous dispersions that may be applied to a fishing line or net with enhanced physical and mechanical properties. Representative polymers include, for example, the polymers listed in Table 1, below. Several commercially available polymers are also listed in the table.

TABLE 1

| Polyhydroxybutyrate/hydroxyvalerate | Unknown |
| Polylactide polymer | Nature Works |
| Polylactide polymer 3051D | Nature Works |
| Polycaprolactone CAPA$^{(R)}$ 6506 | Perstorp |
| Low $M_w$ lactic acid-based polymer | Confidential |
| Polybutylene succinate | Showa Denko |
| Polybutylene succinate adipate #3020 | Showa Highpolymer |
| Polyhydroxy alkaonate | Confidential |
| Polyhydroxyalkaonate copolymer | Kaneka Corp. |
| Starch nanoparticles | EcoSynthetix |

In various embodiments, these listed polymers may be prepared as aqueous dispersions and used as coatings as reported, for example, in "Aqueous Dispersions from Biodegradable/Renewable Polymers," Mika Vaha-Nissi, Christiane Laine, Riku Talja, Hannu Mikkonen, Sari Hyvarinen, Ali Harlin, VTT Technical Research Centre of Finland, Espoo, Rajamiiki, Finland, pp. 1-14, 2010, incorporated by reference herein for the purpose of describing suitable renewable or degradable or both renewable and degradable coatings and polymers. Further, suitable polymers may include minerals or mineral-based materials that are compatible with such polymers to provide polymer composites. Representative minerals such as Aragonite or talc are used to make these types of polymer composites.

As also described in this disclosure, the additives components are materials that include, for example, renewable or degradable materials or both renewable and degradable materials. Suitable additives components or materials may include, but are not limited to, components derived from polyol sources, citrate sources, fatty acid sources, biomass oil sources, or combinations thereof. In some embodiments, suitable plasticizing components are derived from, biomass oil sources, or combinations of biomass oil sources. Suitable components may also be derived from vegetable oils or other plant-based oils. Examples of such additive components or materials include, but are not limited to; components derived coconut oil, corn oil, cottonseed oil, canola oil, olive oil, palm oil, peanut oil, safflower oil, sesame oil, soybean oil, sunflower oil, grapeseed oil, sorghum oil, wheat germ oil, isosorbide, isosorbide esters, or combinations thereof. In some embodiments, suitable plasticizer components may be used to make solvent-based dispersions that are readily applied to the fishing line or net. In yet other embodiments, suitable plasticizer components may be used to make aqueous dispersions that may be applied to a fishing line or net to improve physical and mechanical properties.

Natural Fiber Core Components

Suitable natural fibers for use in the manufacture of embodiments of the disclosed fishing line or net include, for example, cotton, jute, hemp, silk, bamboo, linen, flax, wool, and sisal. These fibers may be used alone as well as in combinations of two or more types of fibers. Those skilled in the art would readily know how to make and use various combinations of fibers in order to provide a fishing line having the desired physical characteristics of, for example, durability, elasticity, flexibility, handle-ability, slide-ability, stiffness, tensile strength, knotting, or wear.

In some embodiments, industrial hemp fibers, used alone or combined with other types of fibers, are suitable fibers. Hemp fibers are renewable and readily available from hemp plants. Hemp plants can be grown in many locations worldwide and can be grown using a variety of known cultivation or farming methods including, for example, traditional cultivation methods, organic cultivation methods and/or irrigation cultivation methods.

Embodied Types of Line Configurations

In some embodiments, a disclosed fishing line is a monofilament or a single strand line made from one strand or thread, while in other embodiments the disclosed fishing line is a braided or plaited line made from two or more strands or yarns. One skilled in the art will recognize that many different types and styles of monofilament, single strand, or braided line may be used in different embodiments of the disclosed fishing line or net in order to provide the line with desirable physical and mechanical characteristics. In various embodiments, simple, complex and very complex braiding designs and patterns may be used to make examples of the disclosed fishing line or net.

In various embodiments, the single strand line may be made using an either a Z or S twist technique. This technique uses twisting and folding processes to make the single strands of the natural fiber stronger by overlapping the natural fibers and the fibers may be twisted during the manufacturing process to be in either a Z or an S direction. In various embodiments, this twisting process fills the voids of the natural strands and results in a fuller and consistently consecutive single strand line. The amount of twist used during the manufacturing process makes the single strand line stronger and sturdier. In some embodiments, the disclosed line configurations may include a relatively simple braided pattern or design of two or three strands or yarns to make a braided line.

In various embodiments simple, complex and very complex braiding designs and patterns may be used to make the disclosed fishing line. In some embodiments, the disclosed line may use a relatively simple braided pattern or design of two or more strands or yarns to make a braided line. In still other embodiments, the disclosed fishing line may use an even more complex braided pattern or design using as many as six or eight or more strands or yarns to make a braided line. One skilled in the art will readily recognize that a suitable braided fishing line may be made with many suitable variations of the number of stands, the size of the strands, and may be made using extremely complex braided patterns and designs to provide the disclosed fishing line or net.

In other embodiments, the disclosed line may be further processed or treated using known textile finishing processes. In an alternative embodiment, for example, the line may be processed using singeing processes and procedures. Typically, the line is subjected to high temperatures using a gas flame, heated plates or heated rollers. Such singeing processes remove processing residues such as, but not limited to, loose fibers, fluff, lint or fuzz. A singed line may provide the line with a smooth, even and clean outer surface as well as improved wetting or coating ability. Suitable singeing processes are described, for example, the article "Singeing/Types of Singeing Process/Application of Singeing in the textiles dyeing industry" providing in electronic format at: https://textilesscholars.blogspot.com/2019/05/singeing-application-processes-of.html.

In addition to the manufacturing and finishing processes set out above, samples of a selected line configuration may be tested for at least tensile strength periodically throughout these processes. In an example simple test, the line is tied to an immovable object, and then pulled to its measured breaking point. In certain embodiments, the tensile strength of a braided fishing line, coated or not, for example, may range from about one pound (4.45 Newtons) to over thousands of pounds (4, 448.22 Newtons or more).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

All patents, patent applications, and publications cited herein are incorporated herein by reference in their respective entities for all purposes. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is embodied and claimed is:

1. A degradable composition for fishing lines or fishing nets comprising a natural fiber core that is coated with a degradable biopolymer, free of polylactic acid, selected from a polyhydroxyalkaonate biopolymer, a polysaccharide biopolymer, or combinations thereof and an additive comprising components derived from i) polyol sources, ii) citrate sources, iii) fatty acid sources, iv) biomass oil sources, v) vegetable oils, vi) non-vegetable plant oils, or combinations thereof.

2. The degradable composition of claim 1 wherein the degradable polysaccharide biopolymer comprises sugar or starch-based monomers and polymers, or combinations thereof.

3. The degradable composition of claim 1 wherein the degradable polysaccharide biopolymer comprises a cellulosic polymer selected from the group consisting of cellulose acetate, cellulose propionate, cellulose butyrate, and combinations thereof.

4. The degradable composition of claim 1 wherein the additive comprises components derived from biomass oil sources, or combinations of biomass oil sources.

5. The degradable composition of claim 1 wherein the additive comprises components derived from vegetable oils, non-vegetable plant oils, or combination thereof.

6. The degradable composition of claim 1 wherein the additive comprises components derived from coconut oil, corn oil, cottonseed oil, canola oil, olive oil, palm oil, peanut oil, safflower oil, sesame oil, soybean oil, sunflower oil, grapeseed oil, sorghum oil, wheat germ oil, isosorbide, isosorbide esters, or combinations thereof.

7. The degradable composition of claim 1 wherein the degradable biopolymer comprises components from renewable materials, and wherein the additive comprises components that are degradable or components from renewable materials, or both components that are degradable and from renewable materials.

8. The degradable composition of claim 1 wherein the natural fiber core comprises cotton, jute, hemp, silk, bamboo, linen, flax, wool, sisal, lignin, or combinations thereof.

9. The degradable composition of claim 1 wherein the natural fiber core comprises hemp.

10. A degradable composition for a fishing line or fishing net consisting essentially of i) a renewable and degradable polymer, free of polylactic acid ii) a renewable and degradable additive, and iii) a natural fiber core.

11. The degradable composition of claim 10 wherein the fishing line or fishing net consists essentially of i) renewable and degradable polymer, ii) renewable and degradable additive, and iii) minor components that do not materially affect the degradable composition.

12. The degradable composition of claim 1 wherein a degradation process comprises a microbial-based process, an oxidation-based process, an ultraviolet light-based process, a free radical-based process, a thermal-based process, or combinations thereof.

13. The degradable composition of claim 12 wherein the degradation process comprises a microbial-based process.

14. The degradable composition of claim 12 wherein degradation provides nontoxic and environmentally safe products.

15. The degradable composition of claim 1 comprising a degradation rate faster than materials used in fishing lines or fishing nets that entangle aquatic animals.

16. The degradable composition of claim 1 manufactured using one or more processes selected from group consisting of spraying, extruding, co-extruding, coating, submersing, laminating, extrusion coating, extruding over a core, or combinations thereof.

\* \* \* \* \*